United States Patent [19]
Ishida

[11] Patent Number: 4,568,973
[45] Date of Patent: Feb. 4, 1986

[54] RADIATION IMAGE REPRODUCING SYSTEM

[75] Inventor: Masamitsu Ishida, Kanagawa, Japan

[73] Assignee: Fuji Photo Film Co., Ltd., Kanagawa, Japan

[21] Appl. No.: 433,491

[22] Filed: Oct. 8, 1982

[30] Foreign Application Priority Data

Oct. 16, 1981 [JP] Japan .............................. 56-165120

[51] Int. Cl.[4] .............................................. H04N 1/40
[52] U.S. Cl. .................................. 358/111; 358/287
[58] Field of Search ................ 358/111, 287; 364/414

[56] References Cited

U.S. PATENT DOCUMENTS

| | | | |
|---|---|---|---|
| 4,258,264 | 3/1981 | Kotera | 250/484.1 |
| 4,276,473 | 6/1981 | Kato | 250/327.2 |
| 4,305,093 | 12/1981 | Nasu | 358/287 |
| 4,315,318 | 2/1982 | Kato | 358/284 |
| 4,346,295 | 8/1982 | Tanaka | 250/327 |
| 4,366,508 | 12/1982 | Crean | 358/287 |
| 4,387,428 | 6/1983 | Ishida | 364/414 |

Primary Examiner—Howard W. Britton
Attorney, Agent, or Firm—Sughrue, Mion, Zinn, Macpeak & Seas

[57] ABSTRACT

In a system for scanning a stimulable phosphor sheet carrying a radiation image stored therein with a stimulating ray to read out and reproduce the radiation image on a recording medium, the size of the stimulable phosphor sheet is detected, the scanning line density of the stimulating ray and the reproduction scaling factor are changed according to the sheet size to reproduce an image of approximately equal size and resolution on a recording medium of a fixed size. When the size of the recording medium is 257 mm×364 mm and those of the stimulable phosphor sheets are 356 mm×432 mm, 356 mm×356 mm, 254 mm×305 mm, and 203 mm×254 mm, the scanning line density is set to 5, 5, 6.7, and 10 pixels per millimeter, respectively, and the reproduction scaling factor is set to ½, ½, ⅔, and 1/1 respectively.

11 Claims, 2 Drawing Figures

RADIATION IMAGE REPRODUCING SYSTEM

BACKGROUND OF THE INVENTION

1. Field of the Invention

This invention relates to a radiation image reproducing system for scanning a stimulable phosphor sheet with a stimulating ray to cause the stimulable phosphor sheet carrying radiation image to emit light in the pattern of the radiation image stored therein, reading out the emitted light to obtain an electric image signal, and reproducing a hard copy of the radiation image on a recording medium by use of the obtained electric image signal. More particularly, this invention relates to a radiation image reproducing system for forming reproduced images of a size approximately equal to each other on recording media of a predetermined size.

2. Description of the Prior Art

When certain kinds of phosphors are exposed to such radiation as X-rays, $\alpha$-rays, $\beta$-rays, $\gamma$-rays or ultraviolet rays, they store a part of the energy of the radiation. Then, when the phosphor which has been exposed to the radiation is exposed to a stimulating ray such as visible ray, light is emitted from the phosphor in the pattern of the stored energy of the radiation. A phosphor exhibiting such properties is referred to as a stimulable phosphor.

As disclosed in U.S. Patent Nos. 4,258,264, 4,276,473, 4,346,295, and 4,387,428, and Japanese Unexamined Patent Publication No. 56(1981)-11395, it has been proposed to use the stimulable phosphor for recording a radiation image of the human body for medical diagnosis. Specifically, the stimulable phosphor is first exposed to a radiation to have a radiation image stored therein, and is then scanned with a stimulating ray which causes it to emit light in the pattern of the stored image. The light emitted from the stimulable phosphor upon stimulation thereof is photoelectrically detected and converted to an electric image signal, which is processed as desired to reproduce an image of a quality suitable for viewing and diagnostic purposes. The image finally obtained may be reproduced as a hard copy or on a cathode ray tube (CRT). When this radiation image system is practically used for medical diagnosis in a hospital or the like, the image finally obtained is often reproduced as a hard copy on a recording medium such as a photographic material to facilitate filing of the diagnostic data.

When the radiation image system mentioned above is put into practice for medical diagnosis, stimulable phosphor sheets of various sizes are used according to what portions of the object are to be radiographed and, therefore, hard copies of various sizes are obtained therefrom. However, when the sizes of the hard copies differ from one another, the radiologist must observe the hard copies from various distances according to the sizes thereof to correctly read the radiation image information recorded thereon. This is actually very troublesome for the radiologist. Further, the hard copies having various sizes are very troublesome to file and handle during long storage thereof in a hospital, making the work in the hospital inefficient. Therefore, it is desired that the sizes of the hard copies be approximately the same.

Many experiments conducted by the inventors revealed that even when the size of a hard copy is reduced by decreasing the picture element density of a certain degree, the obtained hard copy does not adversely affect the diagnostic efficiency and accuracy.

SUMMARY OF THE INVENTION

The primary object of the present invention is to provide a radiation image reproducing system for forming hard copies of an approximately equal size on recording media of a fixed size regardless of the size of stimulable phosphor sheets carrying radiation images stored therein.

Another object of the present invention is to provide a radiation image reproducing system for forming hard copies of radiation images, which are suitable for viewing and diagnostic purposes and easy to file and handle.

The specific object of the present invention is to provide a radiation image reproducing system for quickly reproducing a radiation image stored in a stimulable phosphor sheet by decreasing the scanning line density of the stimulating ray when the stimulable phosphor sheet has a large size.

The radiation image reproducing system in accordance with the present invention comprises a sheet size detecting means for detecting the size of a stimulable phosphor sheet carrying a radiation image stored therein, and a reproduction scaling factor setting means for changing the reproduction scaling factor for a hard copy according to the size of the stimulable phoshpor sheet so as to form a reproduced image on a recording medium of a fixed size. By the reproduction scaling factor is meant the ratio of the size of the reproduced image to the size of the stimulable phosphor sheet. The reproduction scaling factor is set so that reproduced images of an approximately equal size can be obtained on the recording media of a fixed size even when the images are reproduced from stimulable phosphor sheets having various different sizes.

When the reproduction scaling factor is changed according to the size of the stimulable phosphor sheet as described above and the scanning line density of the stimulating ray used for scanning the stimulable phosphor sheet is maintained constant for all sheet sizes, an image reproduced from a stimulable phosphor sheet of a larger size has a higher scanning line density and consequently, a higher sharpness. However, it is useless to unnecessarily increase the scanning line density of the reproduced image. Namely, it is sufficient for a reduced image to have a scanning line density yielding a sufficient image sharpness. Therefore, the radiation image reproducing system in accordance with the present invention also comprises a scanning line density setting means for decreasing the scanning line density of the stimulating ray when scanning a large stimulable phosphor sheet and increasing it when scanning a small stimulable phosphor sheet, thereby obtaining a reproduced image exhibiting approximately the same resolution regardless of the sizes of the stimulable phosphor sheets.

In the present invention, since the scanning line density of the stimulating ray is decreased when a large stimulable phosphor sheet is scanned with the stimulating ray, it is possible to decrease the image data read out from the large stimulable phosphor sheet. As a result, the processing of the image data is simplified, and time required to read out the image data becomes short. Further, since hard copies of an approximately equal image size can be formed on recording media of a fixed size regardless of the sizes of the stimulable phosphor sheets from which the hard copies are reproduced, the radiologists can easily observe the hard copies for diagnostic purposes, and the hard copy filing and handling work in hospitals in greatly facilitated.

DESCRIPTION OF THE PREFERRED EMBODIMENTS

The present invention will hereinbelow be described in further detail with reference to the accompanying drawings.

Figure 1:
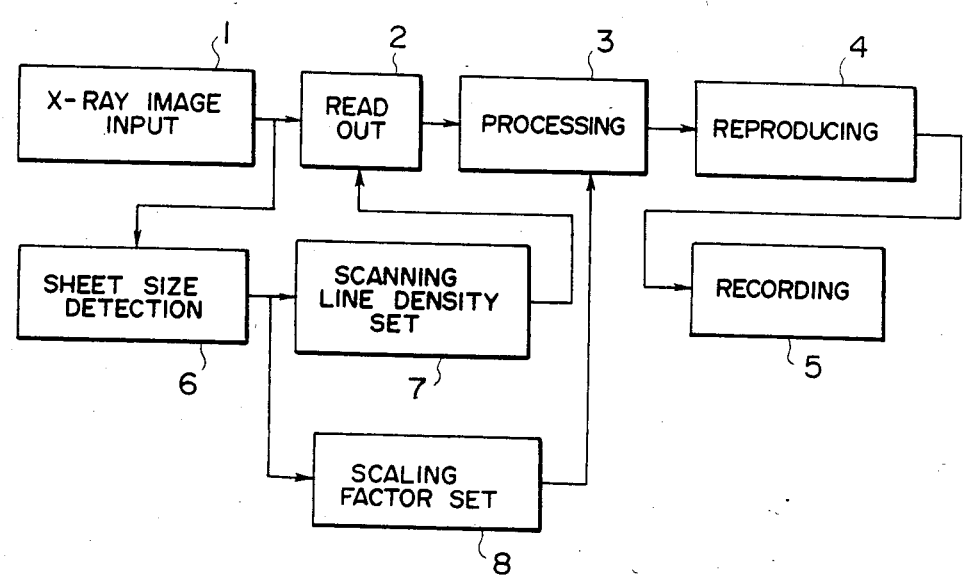
FIG. 1 is a flow diagram showing an embodiment of the radiation image reproducing system in accordance with the present invention.

Referring to FIG. 1, when a stimulable phosphor sheet is exposed to X-rays transmitting through an object at an X-ray image input section 1, it is caused to store the X-ray energy on the trap level of the phosphor. Then, the stimulable phosphor sheet carrying the X-ray energy stored therein is sent to an X-ray image read-out section 2, in which it is scanned with a stimulating ray having a wavelength within the range between 500 nm and 800 nm to excite the stored X-ray energy to a level above the trap level of the phosphor and cause the phosphor to emit light having a wavelength within the range between 300 nm and 500 nm. The light emitted from the phosphor is detected and read out by a photodetector, for example, a photomultiplier or a photodiode, which is formed to receive only the light having a wavelength within the range between 300 nm and 500 $\mu$m. The image signal thus read out is inputted to an image processing section 3 for conducting image processing, for example, intensification of very low frequency, gradation processing and scaling down. The image-processed data is then inputted to an X-ray image reproducing section 4 and converted to an X-ray image reproducing signal, which is inputted to an X-ray image recording section 5 for obtaining a hard copy of the X-ray image by use of a recording medium, for example, a photographic film. In the X-ray image recording section 5, a reproduced image is formed for example by modulating the light source for recording. The image input section 1, image read-out section 2, image processing section 3, image reproducing section 4 and image recording section 5 are described in detail in the publications mentioned above.

In the embodiment described above, stimulable phosphor sheets having sizes of 356 mm×432 mm, 356 mm×356 mm, 254 mm×305 mm, and 203 mm×254 mm can be used for storing X-ray images. Since these phosphor sheet sizes are selected according to the portions of the object to be radiographed, phosphor sheets of various sizes are randomly sent to the X-ray image read-out section 2 during radiographic operations. The X-ray image read-out section 2 is provided, for example, with a sheet clamping platen or the like, at which a sheet size detecting means 6 comprising a photoelectric device or the like is positioned to detect the sizes of the stimulable phosphor sheets sent to the X-ray read-out section 2. As the sheet size detecting means 6 there may be employed not only a photoelectric device but any other suitable means. The sheet size information detected by the sheet size detecting means 6 is inputted to a scanning line density setting apparatus 7 and a reproduction scaling factor setting apparatus 8. Based on the sheet size information, the scanning line density setting apparatus 7 sets the scanning line density of the stimulating ray applied at the X-ray image read-out section 2 to 5 P (pixels)/mm, 5 P/mm, 6.7 P/mm, and 10 P/mm when the sizes of the stimulable phosphor sheets to be read out are 356 mm×432 mm, 356 mm×356 mm, 254 mm×305 mm, and 203 mm×254 mm, respectively. The reproduction scaling factor setting apparatus 8 sets the scaling factor of the reproduced image at the image processing section 3 to ½, ½, ⅔, and 1/1 when the sizes of the stimulable phosphor sheets are 356 mm×432 mm, 356 mm×356 mm, 254 mm×305 mm, and 203 mm×254 mm, respectively.

Figure 2:
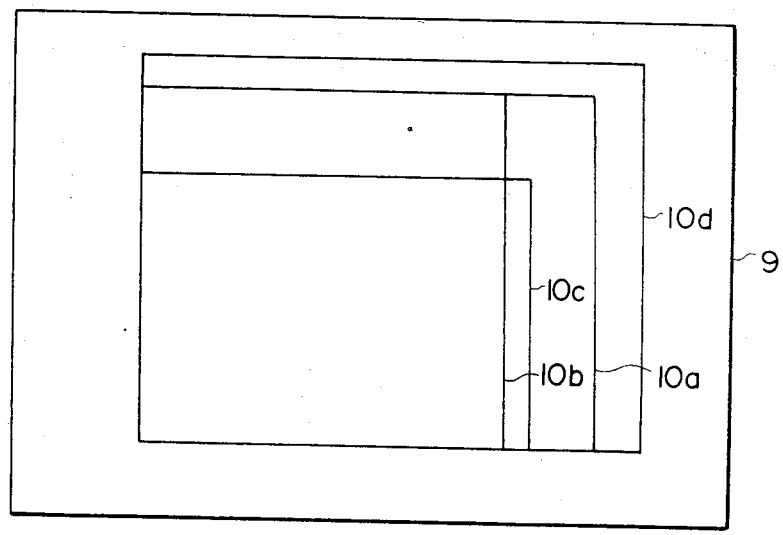
FIG. 2 is a plan view showing the size of hard copies of radiation images formed by the radiation image reproducing system shown in FIG. 1.

FIG. 2 shows the sizes of the X-ray photograph hard copies obtained by the radiation image reproducing system in accordance with the present invention provided with the reproduction scaling factor setting apparatus 8. In this system, a recording medium 9 having a fixed size, i.e., 257 mm×364 mm, is used to record hard copies. Accordingly since the reproduction scaling factor is set as described above, a reproduced image is formed on the recording medium 9 as indicated by 10a (178 mm×216 mm), 10b (178 mm×178 mm), 10c (169 mm×203 mm), or 10d (203 mm×254 mm), when the size of the stimulable phosphor sheet employed in the X-ray image input section 1 is 356 mm×432 mm, 356 mm×356 mm, 254 mm×305 mm, or 203 mm×254 mm, respectively. As shown in FIG. 2, reproduced images having an approximately equal size can be formed on the recording media 9 of a fixed size by setting the scalling factors of the reproduced images in the manner described above even when the stimulable phosphor sheets having various different sizes are employed in the X-ray image input section 1. Further, since the scanning line density of the stimulating ray for reading out the X-ray image stored in the stimulable phosphor sheet is changed as described above by the scanning line density setting apparatus 7, the scanning line density in the reproduced image is fixed at 10 P/mm in ever case. Accordingly, it is possible to obtain reproduced images of the same resolution regardless of the sizes of the stimulable phosphor sheets. Furthermore, since the scanning line density of the stimulating ray for reading out the X-ray image stored in the stimulable phosphor sheet is set so that it is smaller when the size of the stimulable phosphor sheet is larger, it is possible to reduce the time required for the sheet to be read out and the amount of data read out therefrom, thereby facilitating the processing of the data.

It should be understood that the present invention can be embodied in various types other than the above described embodiment. For instance, the reproduced image may be scaled up and down to various extents according to the sizes of the stimulable phosphor sheet and the recording medium for recording the reproduced image, and the scanning line density of the stimulating ray may be changed to other values according to the desired resolution of the reproduced image. Depending on the sizes of the stimulable phosphor sheets, it is also possible to obtain reproduced images of the same size from all phosphor sheet sizes. It is also possible to record the reproduction scaling factor near the image reproduced on the recording medium.

I claim:

1. In a radiation image reproducing system for scanning a stimulable phosphor sheet with a stimulating ray to cause the stimulable phosphor sheet carrying a radiation image to emit light in the pattern of the radiation image stored therein, reading out the emitted light to obtain an electric image signal, and reproducing a hard copy of the radiation image on a recording medium by use of the obtained electric image signal, a radiation image reproducing system comprising a sheet size detecting means for detecting the size of said stimulable phosphor sheet, a scanning line density setting means for changing the scanning line density of said stimulating ray according to the sheet size detected by said sheet size detecting means, and a reproduction scaling factor setting means for changing the reproduction scaling factor for a hard copy according to said sheet size so as to form a reproduced image on a recording medium of a fixed size.

2. A system as defined in claim 1 wherein the size of said recording medium is 257 mm×364 mm.

3. A system as defined in claim 2 wherein said scanning line density is set to 5 pixels/mm, 5 pixels/mm, 6.7 pixels/mm, and 10 pixels/mm, respectively, by said scanning line density setting means when the sizes of stimulable phosphor sheets are 356 mm×432 mm, 356 mm×356 mm, 254 mm×305 mm, and 203 mm×254 mm.

4. A system as defined in claim 2 wherein said reproduction scaling factor for a hard copy is set to $\frac{1}{2}$, $\frac{1}{2}$, $\frac{2}{3}$, and 1/1, respectively, by said reproduction scaling factor setting means when the sizes of stimulable phosphor sheets are 356 mm×432 mm, 356 mm×356 mm, 254 mm×305 mm, and 203 mm×254 mm.

5. A system as defined in claim 1 wherein said sheet size detecting means is positioned between a section for recording said radiation image on said stimulable phosphor sheet and a section for reading out the light emitted from said stimulable phosphor sheet.

6. A system as defined in claim 5 wherein said scanning line density setting means is connected between said sheet size detecting means and said section for reading out the light emitted from said stimulable phosphor sheet.

7. A system as defined in claim 5 wherein said reproduction scaling factor setting means is connected between said sheet size detecting means and a section for processing the electric image signal obtained from said section for reading out light emitted from said stimulable phosphor sheet.

8. A system as defined in claim 1 wherein said stimulating ray has a wavelength within the range between 500 nm and 800 nm.

9. A system as defined in claim 1 wherein said stimulable phosphor sheet is provided with a layer of a phosphor capable of emitting light having a wavelength within the range between 300 nm and 500 nm upon stimulation thereof.

10. A system as defined in claim 1 wherein said recording medium is a photographic film.

11. A system as defined in claim 3 wherein said reproduction scaling factor for a hard copy is set to $\frac{1}{2}$, $\frac{1}{2}$, $\frac{2}{3}$, and 1/1, respectively, by said reproduction scaling factor setting means when the sizes of stimulable phosphor sheets are 356 mm×432 mm, 356 mm×356 mm, 254 mm×305 mm, and 203 mm×254 mm.

* * * * *